United States Patent [19]
Hansen

[11] 3,827,503
[45] Aug. 6, 1974

[54] HARVESTING MACHINE FOR CABBAGE, OR THE LIKE

[76] Inventor: Carl J. Hansen, W. Shelby Rd., Middleport, N.Y. 14105

[22] Filed: July 27, 1972

[21] Appl. No.: 275,528

[52] U.S. Cl.................. 171/38, 171/28, 171/57, 56/327 R
[51] Int. Cl............................................ A01d 27/04
[58] Field of Search............ 171/36, 37, 38, 57, 62, 171/28, 18; 56/327 R

[56] References Cited
UNITED STATES PATENTS

| 1,280,207 | 10/1918 | Glaze | 171/57 |
|---|---|---|---|
| 1,306,586 | 6/1919 | Duke | 171/38 |
| 2,833,357 | 5/1958 | Lust | 171/38 |
| 3,473,614 | 10/1969 | Kemp | 171/28 |
| 3,497,013 | 2/1970 | Baker | 171/38 |
| 3,589,117 | 6/1971 | Wadsworth | 171/38 |

Primary Examiner—Antonio F. Guida
Attorney, Agent, or Firm—Joseph P. Gastel

[57] ABSTRACT

A machine for harvesting a crop item such as a cabbage having a relatively large head located above ground and a stem-root combination connected to said head including a stem merging into an elongated root, comprising a frame, a connection for mounting the frame on a tractor, a snout at the leading end of the frame having an entry portion for receiving the stem, a conveyor comprising a pair of substantially parallel screws of opposite pitch leading upwardly away from said entry portion, means for rotating said screws in opposite directions to engage said stem and move said crop item upwardly along said conveyor, a pair of spaced rails underlying the head for guiding said head in its movement along said conveyor, stabilizing rails below said screws for engaging said stem-root combination to stabilize said crop item during its movement along said conveyor, and a cutter mounted on said frame remote from said snout for severing said stem from said head proximate said head when it reaches the end of movement on the conveyor.

9 Claims, 9 Drawing Figures

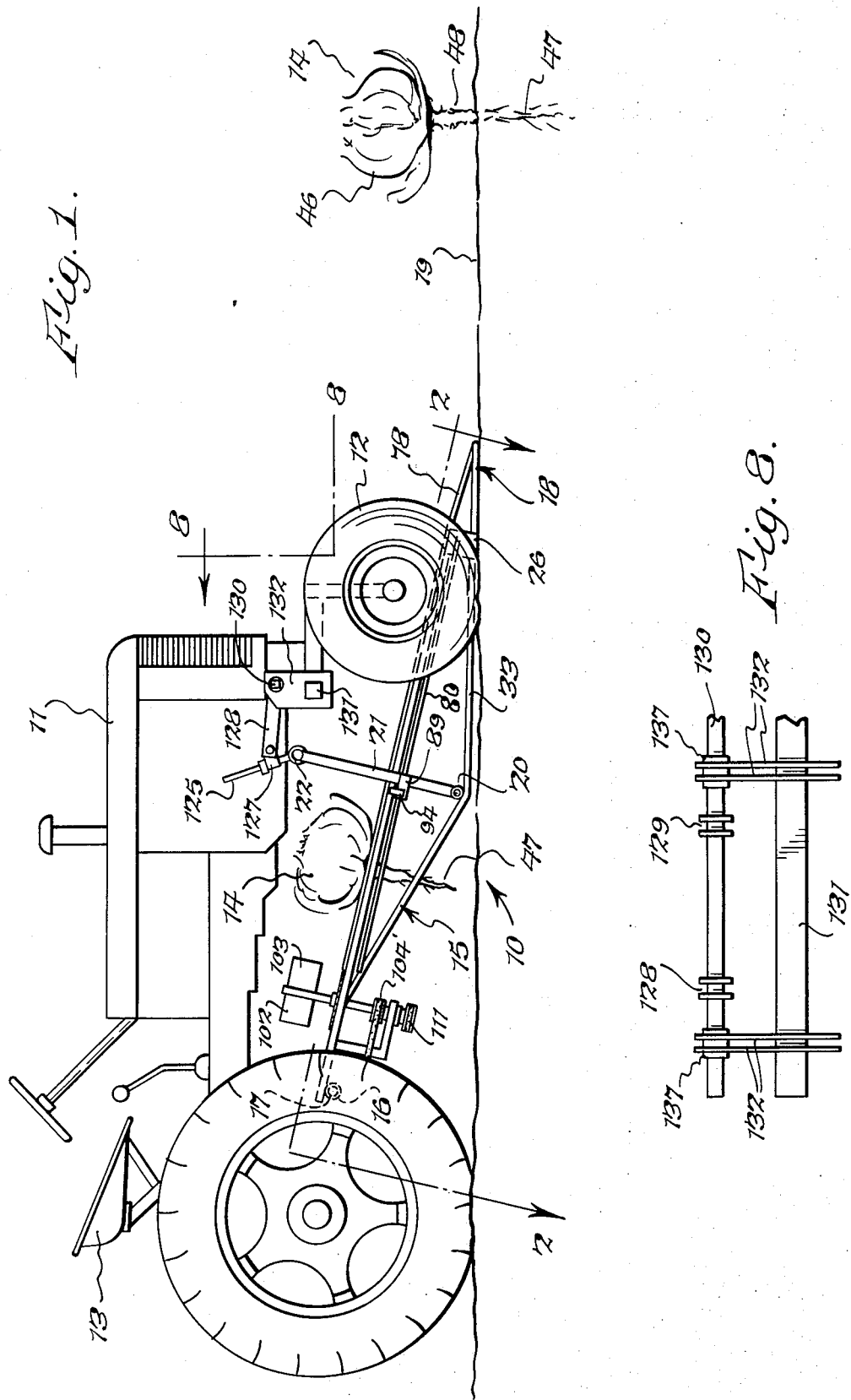

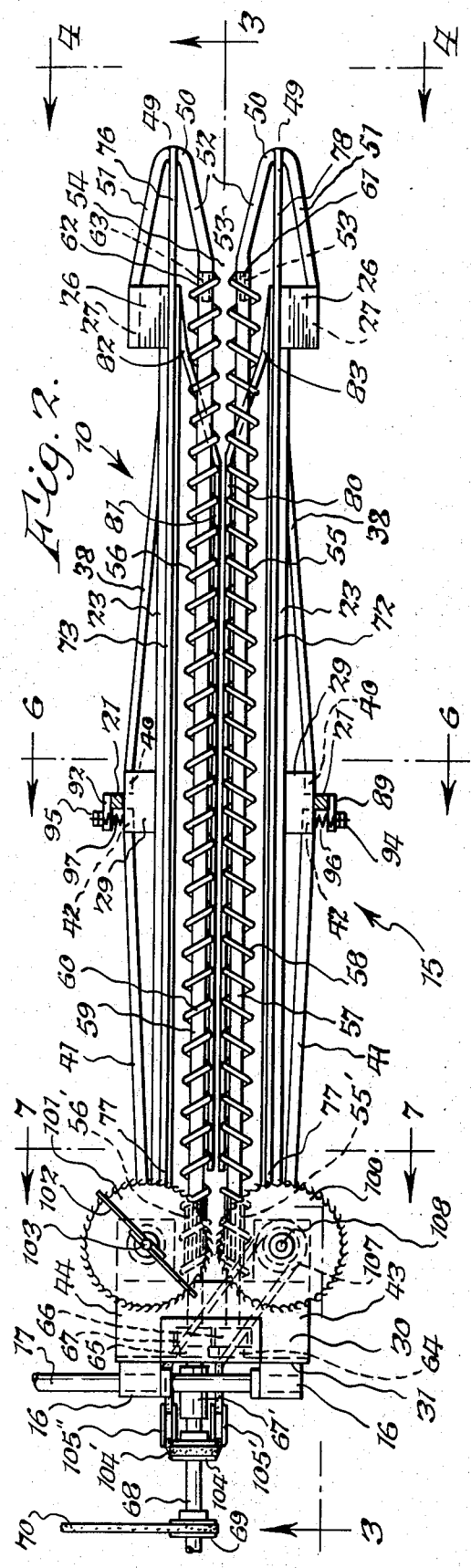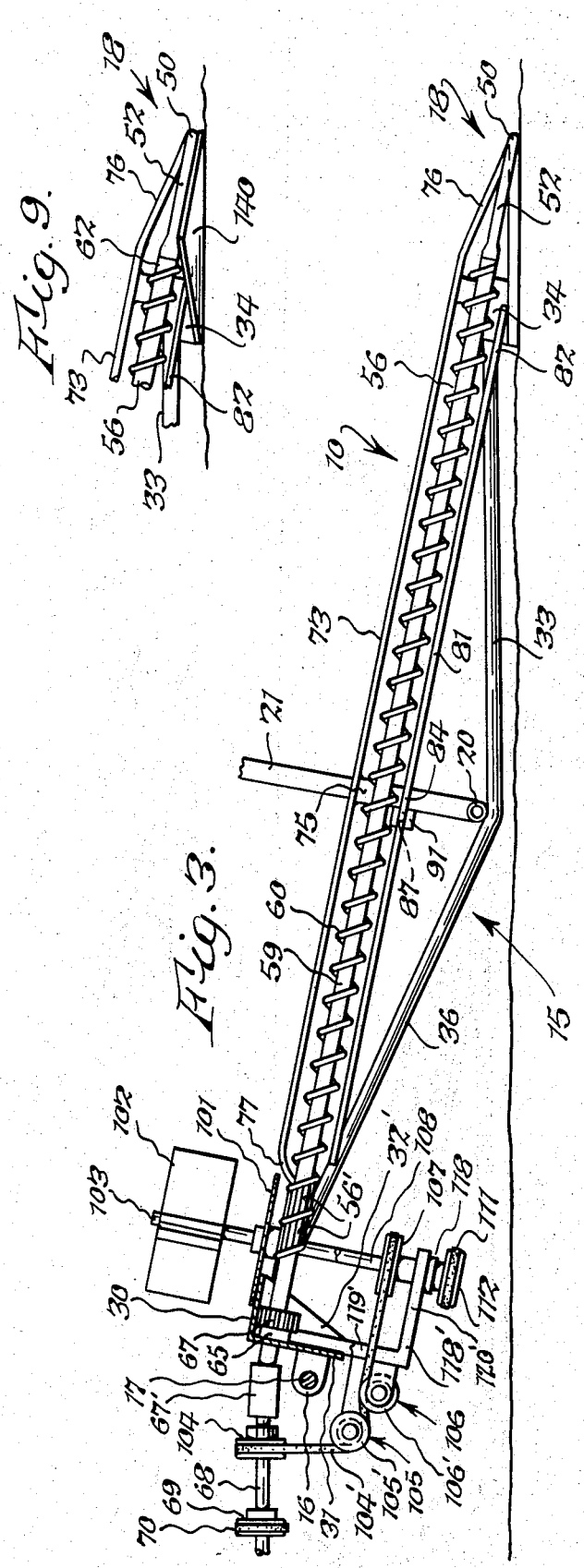

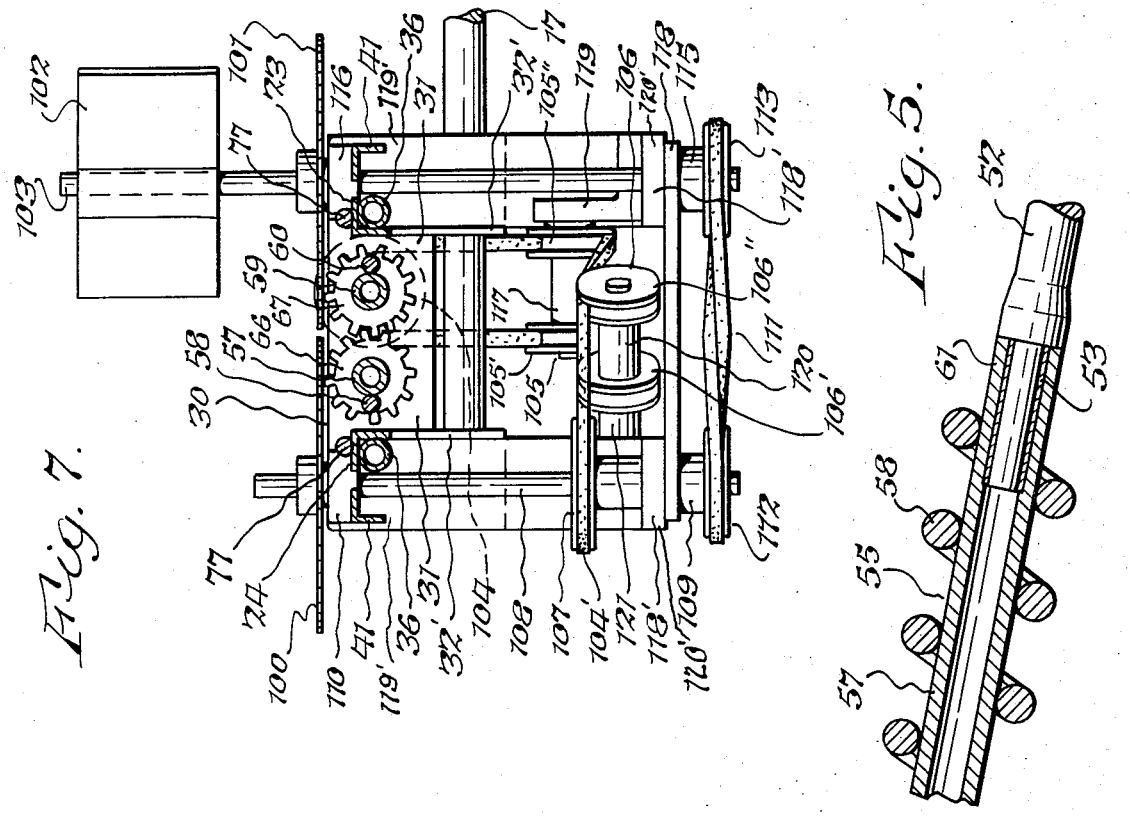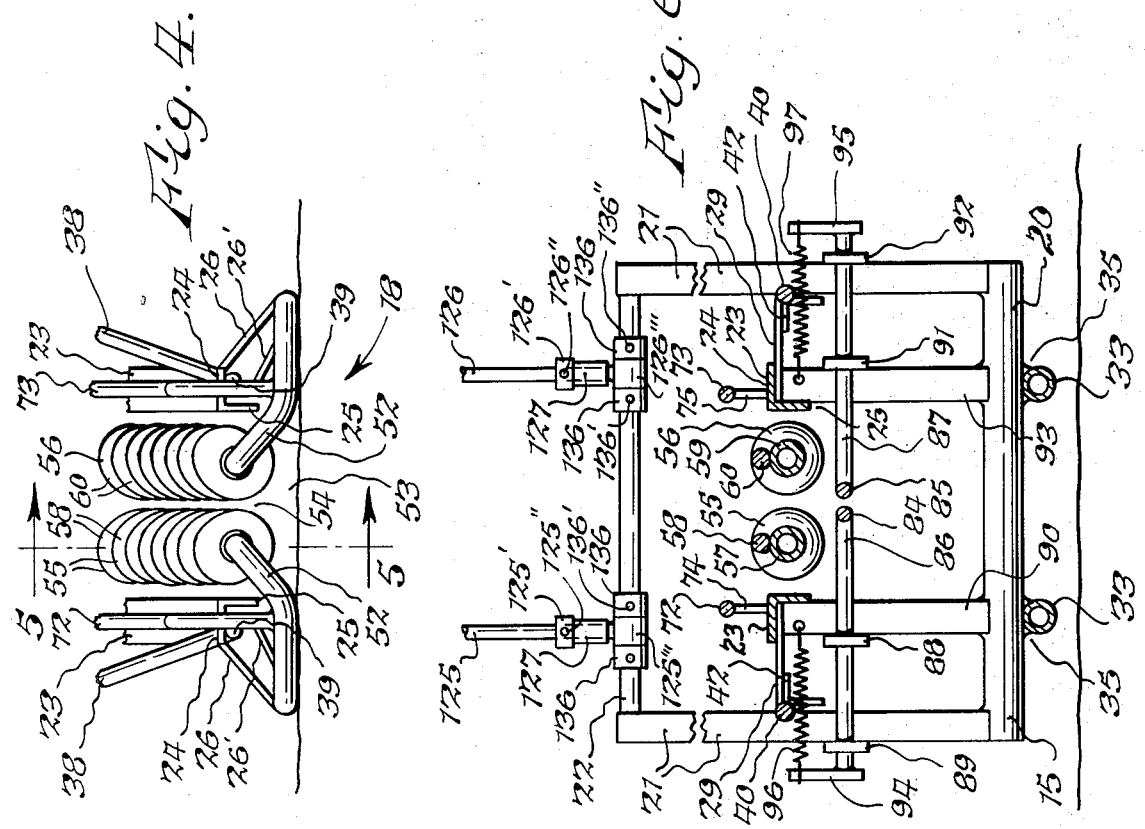

HARVESTING MACHINE FOR CABBAGE, OR THE LIKE

The present invention relates to an improved machine for harvesting cabbages or the like.

By way of background, in the past cabbages were generally harvested by hand. This required the worker to bend over and sever the head from the stem. The cabbage then had to be placed in a container. The foregoing type of manual harvesting was tiring to the worker and low in productivity. There have also been machines used in the past for harvesting cabbages. However, these machines were generally extremely large, cumbersome and expensive, and therefore the use of such machines was limited to the select few who could afford them and they were beyond the reach of the average farmer.

It is accordingly the primary object of the present invention to provide an improved harvesting machine for cabbage or the like which is relatively small and inexpensive and which can be mounted on conventional farm tractors for use by farmers having both relatively small and relatively large cabbage acreage and which will provide a high rate of harvesting.

Another object of the present invention is to provide an improved harvesting machine for cabbage or the like which will automatically scoop a cabbage from the ground, convey it to a trimming station wherein the stem is severed from the head and thereafter eject it in a desired direction.

A further object of the present invention is to provide an improved harvesting machine for cabbage or the like which can be adjusted for use under different conditions in an extremely simple and expedient manner for optimum harvesting capability.

Yet another object of the present invention is to provide an improved harvesting machine for cabbage or the like which includes structure for severing the stem of the cabbage extremely close to the head in a very clean manner and in so doing also removes the loose leaves around the cabbage head so as to minimize the trimming which is necessary in preparing the cabbages for market. Other objects and attendant advantages of the present invention will readily be perceived hereafter.

The improved harvesting machine of the present invention is for harvesting a crop item such as cabbage or the like having a head located above ground and an elongated stem-root combination, comprising a frame, snout means on said frame located in contiguous relationship to the ground, an entry portion in said snout means for receiving said stem to thereby guide said stem to the remainder of the machine and scoop said crop item from the ground, and conveyor means proximate said entry portion for receiving said stem from said entry portion for conveying said crop item upwardly away from said snout means, and severing means proximate said conveyor means and remote from said snout means for severing said head from the remainder of said crop item.

The various aspects of the present invention will be more fully understood when the following portions of the specification are read in conjunction with the accompanying drawings wherein:

FIG. 1 is a side elevational view of the improved harvesting machine of the present invention mounted on a tractor and shown in relationship to a row of cabbages which are to be harvested;

FIG. 2 is a fragmentary view taken substantially in the direction of line 2—2 of FIG. 1 and showing the harvesting machine in plan;

FIG. 3 is a fragmentary cross sectional view of the harvesting machine in greater detail than shown in FIG. 1 and taken substantially along line 3—3 of FIG. 2;

FIG. 4 is a view of the snout of the harvesting machine taken substantially in the direction of line 4—4 of FIG. 2;

FIG. 5 is an enlarged fragmentary cross sectional view taken substantially along line 5—5 of FIG. 4 and showing the manner in which the front end of the screw is journalled for rotation;

FIG. 6 is a fragmentary cross sectional view taken substantially along line 6—6 of FIG. 2 and showing the bracket for supporting the harvesting machine from the tractor and other structure of the machine;

FIG. 7 is a fragmentary cross sectional view taken substantially along line 7—7 of FIG. 2 and showing the various drives associated with the machine;

FIG. 8 is a fragmentary view of the linkage for supporting the cabbage harvester on the tractor taken in the direction of line 8—8 of FIG. 1; and FIG. 9 is a fragmentary view similar to FIG. 3 of an alternate type of snout with a shoe thereon.

The improved harvesting machine 10 of the present invention is shown mounted on tractor 11 from which it receives its power drive. As can be visualized from FIG. 1, the harvesting machine 10 extends longitudinally of the tractor and its front end is located directly to the inside of front tractor wheel 12 and is positioned between this wheel and the centerline of the tractor so that the tractor driver may look to his right while seated in seat 13 to observe the relationship between the front end of the harvesting machine and the row of cabbages 14 which are to be harvested. While the following description will refer specifically to cabbages for which the machine was developed, it will be appreciated that the machine of the present invention can also be used for harvesting like crop items such as cauliflower, broccoli and Brussels sprouts, but is not limited thereto.

The harvesting machine 10 may be mounted on any type of tractor by the use of suitable mounting brackets. The harvesting machine 10 includes a frame 15 having sleeves 16 (FIG. 2) at one end which is journalled on shaft 17 extending outwardly from the tractor frame and about which the remainder of the harvester frame 15 can pivot to adjust the elevation of gathering snout 18 relative to ground 19. In the foregoing respect, frame 15 also includes a substantially rectangular frame portion (FIG. 6) consisting of lower horizontal strut 20, a pair of generally vertical struts 21 having their lower ends welded to strut 20 and an upper horizontal strut 22 having its opposite ends welded to the upper ends of struts 21. By raising or lowering horizontal strut 22, the remainder of the harvesting machine can be caused to pivot about shaft 17.

Frame 15 includes a pair of substantially parallel spaced main angle members 23 having horizontal legs 24 and vertical legs 25 (FIGS. 2, 4 and 6). Downwardly inclined plates 26 and 26' are welded to and extend outwardly and downwardly from angles 23 and the outer ends of these plates are welded to the end portions 27 of snout 18. Central plates 29 (FIGS. 2 and 6) have their inner ends welded to the undersides of horizontal legs 23 and their outer ends are welded to vertical frame members 21 which are square rods. The ends of the angles 23 remote from snout 18 are welded to the underside of plate 30 having a depending plate portion 31 (FIG. 3) to which sleeves 16, noted above, are welded. Vertical legs 119' of members 118' are welded to plate 31, and gussets 32' are welded between each angle 23 and leg 119'. Horizontal legs 120' extend forwardly from legs 119', and legs 119'-120' comprise an angle member 118'.

In addition to the foregoing frame portions, the frame 15 also includes a pair of substantially parallel main lower struts 33 having their front ends secured, as by welding, to the undersides of horizontal portions 24 of angles 23 at 34 (FIG. 3) and their central portions secured as by welding to the undersides of central horizontal strut member 20 at 35 (FIG. 6). Each strut 33 also includes an upwardly extending portion 36 leading from horizontal strut 20 (FIG. 3). The upper ends of portions 36 are welded to the undersides of horizontal portions 24 of angle 23 at the upper portion of the machine (FIG. 7). A pair of diverging rods 38 have their front ends 39 welded to the undersides of horizontal leg portions 24 of angles 23 in the vicinity of plates 26. Their opposite ends 40 are welded to the undersides of plates 29 (FIG. 6). Angles 41 have their ends 42 welded to the undersides of plates 29 and their opposite ends are welded to the underside of portions 43 and 44 of plate 30. The above described frame provides a good firm support for the various other parts of the harvesting machine 10.

By way of background, a cabbage 14 includes a head 46 which grows above ground and a single main root 47 which grows below ground, and a stem portion 48 therebetween. The head 46 is generally 5 to 8 inches in diameter, the stem 48 is generally about 5 to 6 inches long, and main root 47 is generally about 6 inches long. Cabbages 14 are planted in a straight row so that they can be harvested by machine 10 which is mounted on tractor 11 which is driven along the row of cabbages and maintained in alignment therewith by the driver of the vehicle who can observe the relationship of the cabbages with respect to the harvesting machine 10 by merely leaning sideways and to the right from his seated position in seat 13. As noted above, the harvesting machine 10 includes a snout 18 having spaced portions 49 having blunt ends 50. Extending rearwardly from blunt ends 50 are skid portions 51 which ride on the ground and the rear ends 27 of skid portions 51 are secured by welding to the lower ends of plates 26 and 26'.

Extending upwardly from each blunt end portion 50 and converging toward each other are cam portions 52 which define a converging entry space 53 therebetween. The inner ends of portions 52 each include a bearing rod portion 53. It can thus be seen that as the snout portion 18 approaches a head of cabbage, converging portions 52 will bracket the stem 48 between the root 47 and the head 46 of the cabbage and as the machine travels longitudinally relative to the head of the cabbage, cam portions 52 will engage the underside of head 46 and lift cabbage 14 upwardly out of the ground by essentially pulling root 47 vertically. Of course in the event that stem 48 is longer than the height of portions 52 above the ground, they will merely guide stem 48 into the space between crews 55 and 56. The converging portions 52 of snout 18 will guide the head 46 to the point where it enters throat portion 54 which is located between oppositely rotating screws 55 and 56 which comprise an upwardly extending conveyor. Screw 55 includes a shaft portion 57 with a circular rod 58 wound around shaft 57 in a helical manner and welded thereto. Screw 56 includes a shaft 59 and a rod 60 wound thereon in a helical manner and welded thereto.

It can be seen from FIG. 2 that screws 55 and 56 are of opposite pitch and they are caused to rotate in opposite directions so as to carry cabbages from throat 54 upwardly. In FIG. 4 screw 55 rotates in a clockwise direction and screw 56 in a counterclockwise direction. As noted above, the lower end 61 of screw 55 is journalled on bearing 53. The lower portion 62 of screw 56 is journalled on bearing portion 63 which is analogous to bearing portion 53. Screws 55 and 56 are unsupported throughout their length and the ends of the screws remote from bearing portions 53 and 63 are journalled in bearings 64 and 65 (FIG. 2) supported on the underside of plate 30. Gears 66 and 67 are keyed to screws 55 and 56, respectively, and these gears are in mesh with each other. Therefore the threads 58 and 60 will maintain the orientation relative to each other shown in FIG. 2 so as to provide in essence spaced traveling pockets in which stems 48 are held as they are conveyed upwardly during rotation of screws 55 and 56. A flexible coupling 67' extends between shaft 59 of screw 56 and shaft 68 which is suitably journalled for rotation on tractor 11 and which has pulley 69 keyed thereon which is encircled by belt 70 which also encircles another pulley (not shown) driven from a rotating part of the tractor. It can thus be seen that screws 55 and 56 are driven in opposite directions from belt 70 by means of pulley 69, flexible coupling 67' and meshing gears 66 and 67.

As noted above, screws 55 and 56 turn in a clockwise and counterclockwise direction, respectively, as viewed from FIG. 4 and in so doing the shaft adjacent outer surfaces of portions 57 and 59 will engage the stem 48 of the cabbage with a downward force to tend to maintain the head 47 of the cabbage biased toward screws 55 and 56 while the helical threads 58 and 60 move the cabbage upwardly. To enhance the movement of the head lengthwise along screws 55 and 56, spaced substantially parallel rails 72 and 73 are provided with the lower ends 76 of the rails secured by welding at blunt portions 50 of snout 18. Rails 72 and 73 are mounted on the top of webs 74 and 75, respectively, which extend upwardly from horizontal portions 24 of angles 23 (FIG. 6). As can be seen from FIG. 3, there is a lead-in portion 76 on rail 73 which extends from portion 50 of snout 18 to the main portion of rail 73, and the trailing end 77 of rail 73 leads downwardly and is secured as by welding to frame angle 23. Track 72 is of identical construction and includes a lead-in portion 78, which is analogous to lead-in portion 76, and a trailing portion (not shown) which is analogous to trailing portion 77 (FIG. 3). Thus, the underside of each head 46 will ride on rails 72 and 73 as the stem 48 of each cabbage 14 is engaged by screws 55 and 56 and conveyed upwardly. Rod-like rails 72 and 73 are spaced laterally outwardly from the adjacent portions of outer surfaces of shaft portions 57 and 59 which are in actual engagement with the stem, said outer surfaces of shafts 57 and 59 being the bases of the threads 58 and 60.

To further stabilize the cabbage 14 in its travel upwardly, a pair of lower rails 80 and 81 are provided below angles 23. The lower end 82 (FIG. 3) of rail 81 is secured, as by welding, to the inside of plate 26 and the lower end 83 of rail 80 is secured as by welding to the underside of the opposite plate 26. The central portions 84 and 85 of rails 80 and 81, respectively, are secured as by welding to the inner ends of rods 86 and 87, respectively, which are mounted for sliding movement in holes (not shown) in suitable plates secured to the frame 15. In this respect rod 86 is mounted for sliding movement in plates 88 and 89 secured, as by welding, to struts 90 and 21, respectively, extending upwardly from horizontal strut 20 (FIG. 6). Rod 87 is mounted for sliding movement in plates 91 and 92 secured, as by welding, to struts 93 and 21, respectively (FIG. 6). At this point it is to be noted that struts 90 and 93 have their opposite ends secured as by welding to strut 20 and angles 23. Handles 94 and 95 are secured as by welding to the outer ends of rods 86 and 87, respectively, and tension springs 96 and 97 pull handles 94 and 95 inwardly toward each other. In this respect spring 96 extends between handle 94 and strut 90, and spring 97 extends between handle 95 and strut 93. Because of the action of springs 96 and 97, rails 80 and 81 are biased toward each other as can be seen in plan in FIG. 2. Thus, as the root 47 moves upwardly by the action of screws 55 and 56, a point will be reached where it is engaged by opposed rails 80 and 81 and the root will be stabilized by sliding engagement with rails 80 and 81 so that head 14 is guided upwardly in the desired manner in the orientation shown in FIG. 1, namely, with the underside of head 46 sliding on tracks 72 and 73, the stem 48 being engaged by screws 55 and 56 and root 47 being guided by spaced rails 80 and 81.

The head 14 will move upwardly along the conveyor consisting of opposed screws 55 and 56 until such time as it reaches rotary saws 100 and 101 at which time the stem 48 will be severed directly adjacent head 46 and the root 47 and stem 48 will drop onto the ground where it will eventually rot. In this respect, it is to be noted that the upper ends of rods 80 and 81 are unconnected so that root 47 is disengaged therefrom before saws sever head 46 from the remainder of the plant. A rotating flipper 102 mounted on vertical shaft 103 expels or ejects head 46 sidewardly onto a suitable conveyor (not shown) which carries it to a truck driving parallel to tractor 11. It is to be noted that splines 55' and 56' are formed on shafts 57 and 59, respectively, to pull root 47 downwardly immediately before stem 48 is cut from head 46 so that the cut will occur as close to head 46 as possible and in so doing will also sever the loose leaves which are on the outside of head 46.

Rotary saws 100 and 101 are driven from rotating shaft 68 by belt 104' which extends around pulley 104 keyed to shaft 68, around pulley pairs 105 and 106, and pulley 107 keyed to shaft 108 which is journalled in spaced bearings 109 and 110 and mount rotary saw 100 at its upper end. A crossed over belt 111 extends between pulley 112 keyed to the lower end of shaft 108 and pulley 113 keyed to the lower end of shaft 103 which is journalled in bearings 115 and 116 and mounts saw 101 at its upper end. Shaft 103 also mounts flipper 102 above saw 101, as noted above. More specifically in the foregoing respects, pulley pair 105 (FIG. 7) comprises pulleys 105' and 105" journalled on shaft 117 which is mounted on an angle member 118' by block 119. Pulley pair 106 includes pulleys 106' and 106" mounted on shaft 120 secured to block 121 which is mounted on angle member 118'. A bar 118 extends across legs 118' to stabilize them at their outer ends.

There is also included in the harvesting machine an arrangement for raising or lowering the front end of the harvester. In this respect a pair of spaced links 125 and 126 having eyes 125''' and 126''' on their lower ends journalled on cross bar 22. An ear 127 is adjustably secured by collars 125' and 126' to each lever 125 and 126, respectively, and is located between spaced pairs of levers 128 and 129 having their other ends keyed to cross bar 130. Cross bar 130 is supported on main cross bar 131 by spaced pairs of plates 132. Cross bar 130 is mounted in bearings 137 rotatable in plates 132. The inner end of shaft 130 is connected to a drive on the tractor. When shaft 130 is rotated in a clockwise direction in FIG. 1, levers 128 and 129 will also rotate in this direction and the frame 15 will be caused to pivot about shaft 17 in a counterclockwise direction.

The frame 15 can be adjusted laterally on tractor 11. In this respect, sleeves 16 are slidable on shaft 17. In addition, sleeves 136 are movable axially along shaft 22 (FIG. 6) and are tightened by set screws 136' in bracketing relationship to links 128 and 129 after frame 15 has reached its fully adjusted position.

In FIG. 9 an alternate snout construction is shown wherein a shoe 140 is fixedly affixed to the underside of snout 18 to provide a ski-like riding effect for the front end of the harvester. More specifically a shoe 140 is provided for each snout portion 49, and each shoe extends across each portion 49 from cam portion 52 to skid portion 51.

While the harvesting machine of the present invention has been described with respect to cabbages for which it was designed, it will be appreciated that the structure disclosed above may, with suitable modification, if required, be utilized in the harvesting of other crop items having a head, stem and root structure similar to cabbage, such as cauliflower, broccoli and Brussels sprouts, but is not limited thereto.

What is claimed is:

1. A machine for harvesting a crop item having a head located above ground and a stem connected to said head and merging into an elongated root located below ground comprising a frame, lifting means on said frame located in contiguous relationship to the ground for lifting said crop item from the ground, conveyor means positioned in underlying relationship to said lifted head with an entry portion proximate said lifting means for engaging said stem and conveying said crop item away from said lifting means with said head positioned above said conveyor means, stabilizing means located below said conveyor means for engaging said root to stabilize said crop item while it is being conveyed by said conveyor means, and head-supporting means located above said conveyor means for supporting said head as it travels along said conveyor means.

2. A machine as set forth in claim 1 wherein said stabilizing means comprise a pair of elongated rail means for receiving said elongated root therebetween.

3. A machine as set forth in claim 2 including means for biasing said elongated rail means toward each other.

4. A machine as set forth in claim 2 wherein said conveyor means comprise elongated substantially parallel screw means of opposite pitch for engaging said stem.

5. A machine as set forth in claim 4 wherein said parallel screw means and said elongated rail means extend substantially parallel to each other.

6. A machine as set forth in claim 1 wherein said head-supporting means comprise a pair of spaced elongated rail means for engaging the underside of said head.

7. A machine as set forth in claim 6 including means for driving said screw means in opposite directions so as to pull said head downwardly on said spaced elongated rail means.

8. A machine as set forth in claim 7 wherein said stabilizing means comprise a second pair of spaced elongated rail means.

9. A machine for harvesting a crop item having a head located above ground and a stem connected to said head and merging into an elongated root, comprising a frame, lifting means located in contiguous relationship to the ground for lifting said crop item from the ground, elongated conveyor means for conveying said crop item away from said lifting means, head-engaging means located above said conveyor means and extending substantially throughout the length of said conveyor means for engaging said head and guiding said head during its travel with said conveyor means, said head-engaging means comprising a pair of spaced elongated rod-like rail means for engaging the underside of said head, said elongated conveyor means comprising screw means of opposite pitch including thread means extending outwardly from base means, and means for rotating said screw means in opposite directions so as to cause adjacent portions of said base means to engage opposite sides of said stem and pull said head downwardly on said spaced elongated rail means, said screw means and said rail means extending substantially parallel to each other, and said rail means being laterally outwardly spaced from said adjacent portions of said base means of said screw means which are in actual engagement with said stem.

* * * * *